Figure 1:
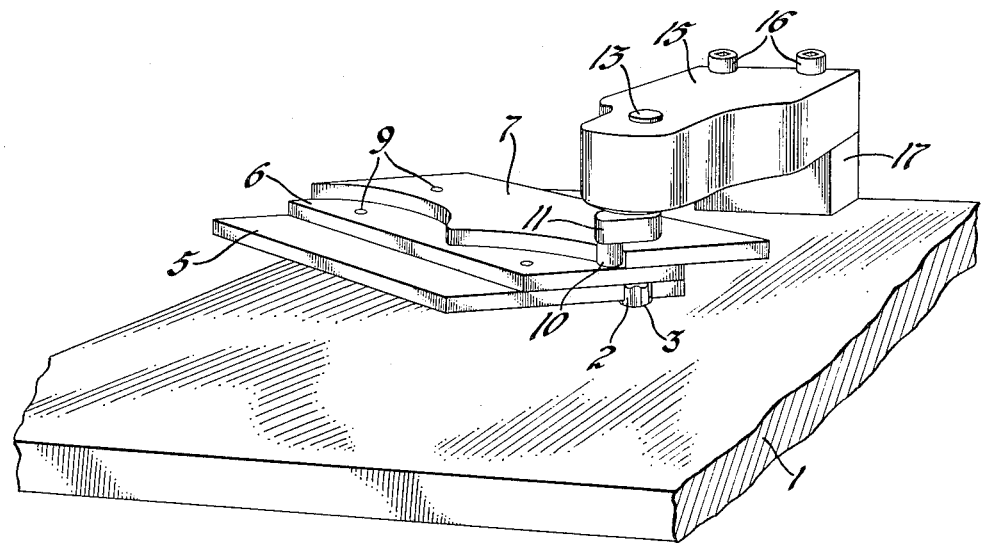

May 16, 1950     T. P. KRAUSE     2,507,982
REPRODUCING MECHANISM
Filed Dec. 4, 1946

Inventor
Theodore P. Krause
By
Spencer, Willets, Helmig & Baillio
Attorneys

Patented May 16, 1950

2,507,982

UNITED STATES PATENT OFFICE 2,507,982

REPRODUCING MECHANISM

Theodore P. Krause, Detroit, Mich., assignor to General Motors Corporation, Detroit, Mich., a corporation of Delaware Application December 4, 1946, Serial No. 714,101

7 Claims. (Cl. 90—62)

This invention relates to the art of forming an article to an outline in reverse complement to an existing pattern and more particularly to an improved mechanism to enable use of a template for easily and quickly reproducing its counterpart.

Heretofore a common expedient has been to follow a template guide edge with a pencil mark line on the stock or blank and then saw along the line, usually by feeding the blank to a band saw and turning the blank relative to the saw, as called for when the line is other than straight. As distinguished from those reproductions which need only to approximate the pattern, the making of a mating template from an existing or master template necessarily requires care and skill to obtain a satisfactory degree of accuracy and the difficulty is pronounced if the outline to be cut is of compound curvature or is otherwise complex in shape.

To reduce the care and skill required and to assure better duplication in reverse it is here proposed to employ a rotary cutter for operation on a blank fixed to the existing template which engages a guide pin carried by a crank arm freely swiveled on an axle coincident to the rotary cutter axis with the radially offset guide pin having its template engaging surface spaced from the swivel axis a distance substantially equal to the radius of the cutter tool or rotary mill wherefore the template engaging surface of the offset pin, regardless of the position to which the crank arm is swung, will be axially aligned with the cutting edge of the mill. In other words, the offset pin guide surface is always intersected by a line projected parallel to the axis from the cutter periphery and this relation insures that the line being cut will exactly follow the edge of the master or existing template. In all angular positions of the swinging guide pin relative to the fixed cutter axis the axial alignment of the template contact point with the cutter periphery is maintained. The operator merely feeds the fixed together template and blank past the cutter with the template bearing on the contact point of the eccentrically located guide pin, whose swiveled crank enables it to swing about the cutter axis to suit the conformity of the template guide edge traveling past it.

A combined forward and lateral thrust on the work moves the blank past the milling cutter and holds the template against the guide point and since the swiveled guide is free to swing to and fro about the cutter axis as template contour irregularities are presented there is eliminated to a considerable degree the need for bodily turning the work as it is being fed forward as heretofore has been required with band sawing to a pencil line. With the present arrangement the operator is relieved of the skillful care of handling the work when feeding it to a cutting tool according to a sight line and instead he need only keep the template in contact with the crankpin without concentrated attention to the cutter action on the blank.

Figure 2:
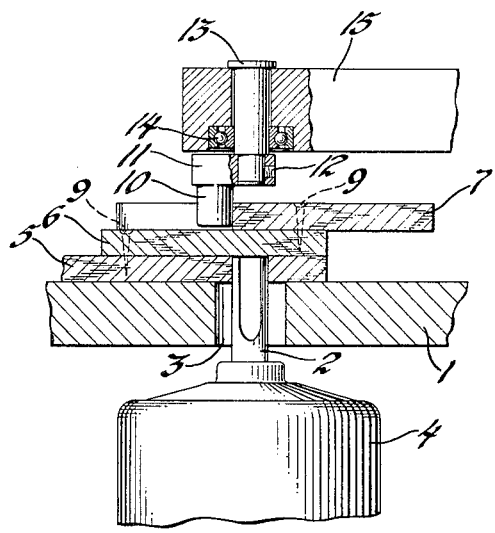
Figure 3:
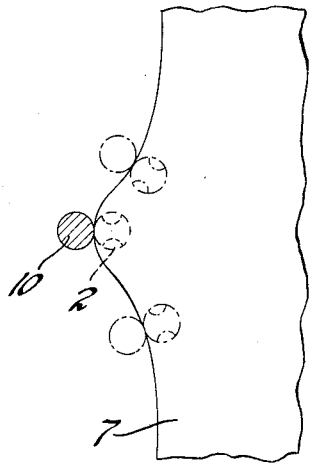

For a better explanation of the invention reference may be made to a preferred embodiment as illustrated in the accompanying drawing wherein Figure 1 is a perspective view of a suitable arrangement for mounting the cutter and guide in cooperative relation to each other and to the workpieces; Figure 2 shows the mechanism in tranverse section and Figure 3 is a diagrammatic representation of a template of irregular curvature and a few of the relative angular positions which the crank arm automatically assumes in guiding the blank to the operating cutter.

A suitable base supports a flat table top 1 and a power driven rotary spindle 2 which projects upwardly through an opening 3 in the table top to a given distance above the upper table surface. Near its upper end the spindle 2 is formed with flutes in its sides to afford peripheral cutting edges and its lower end may be removably clamped in a coupling chock carried by the shaft of the drive mechanism, such as an electric motor, which together with the chock is preferably enclosed by a protective shield 4 to exclude dust and chips resulting from the cutter action and falling down through the clearance opening 3 in the table top 1. By supporting the driving motor in rigid relation with the table top the cutter axis of rotation is fixedly located. Either the support for the motor or that of the table may be such as to enable relative adjustment axially of the cutter to control the height of the cutter spindle above the upper surface of the table to fit the thickness of the blank to be operated upon. Alternately this purpose can be accomplished by the provision of various lengths of cutters for interchangeable use.

Although the drawing shows the cutter projecting above the table top to a height corresponding with the thickness of the blank 5 from which a template is to be cut the projection of the cutter may be either greater or less than the blank thickness. If it projects above the blank a cleaner cut free of burrs will be had but also the spacer 6, which ties or fixes together the blank 5 and the master template 7, will also have material removed from it thereby marring it and reducing its useful life. On the other hand, a shorter cutter will form only a groove in the underside of the blank rather than cut through the blank but this will eliminate the need for the tie and spacer piece 6. Where the cut is almost but not quite through the blank only a thin wall remains to be easily broken off and then the formed edge can be filed smooth. When the workpieces are of metal they should be temporarily secured together by cementing, bolting or the like, whereas if they are of wood they may be more readily joined by removable screws or brads, as indicated at 9.

In order to match the template edge perfectly with the edge being cut, the relation of the parts is such that the edge portion of the master template 7 overlies the top of the cutter 2 and the template guide edge is in vertical alignment with the cutter periphery where it engages the cooperating guide or contact surface of the crank arm pin 10 dependent from the cheek or lever 11 swivelly mounted coaxially of the cutter axis. For convenience of assembly it is fastened by a set screw 12 on the lower end of a fulcrum pin or stud 13 rotatably mounted by an antifriction bearing 14 in the arm 15 which overhangs the table surface and is fastened thereto at the side by holddown bolts 16 and a spacer block 17. Spacer blocks of different height or the use of shims therewith, will permit the guide pin 10 to be raised or lowered in relation to the table top 1.

In the cutting operation the workman will push the temporarily secured together workpieces 5, 6 and 7 across the table top 1 with sufficient force to keep the master template 7 in contact with the offset crankpin 10 as the blank 5 is fed to the cutter 2. When riding on hills and valleys or other contour irregularities, the crank arm 11 will swing or roll freely about the cutter axis on contour advance or recession and maintain the position of the template edge at all times in line with the cutter periphery so that a true reproduction in the blank takes place without extreme care in the manipulation of the blank.

To clarify the action of the swinging arm reference is made to Figure 3 wherein a fragment only of a simple template contour is shown as consisting of curves leading to and from a bulge and it may be assumed that the general direction of travel of the template is toward the upper edge of the sheet. In addition to feeding the work forward the operator uses sufficient side pressure to keep the template in contact with the guide pin 10. Thus when the cutter is operating on a straight line parallel to the direction of feed travel or at a point of curvature whose tangent is parallel to the general direction of feed travel, the side pressure causes the crank arm pin to swing to the position illustrated by full lines in Figure 3, which makes a right angle to the direction of feed travel. It will swing to other angular positions as template contour changes. In those portions of the template where the template contour approaches the bulge and recedes from the bulge respectively, the angular positions of the crank arm are shown by broken lines in Figure 3. In all positions the cutter will operate on the blank in exact accordance with the template outline as insured by the free swiveling action of the guide as the work is moved forward.

While the foregoing description makes reference to the location of the cutter as projecting upwardly from the table and below the swinging guide it will be apparent that this relation may be reversed, in which case the cutter and its drive motor are mounted by a supporting bracket above the table and the swinging guide arm is swiveled in the table for projection upwardly above the table top. With the template on the underside of the blank it can be brought into engagement with the contact point of the guide and the operator can observe the progress of the cutter through the blank. As a matter of choice most operators prefer the template on top and its engagement with the contact guide pin within easy vision.

I claim:

1. For cutting a template in reverse complement to an existing template and from a blank secured in fixed relation to the existing template, a pair of cooperating members, one of which is a rotary cutting tool having a fixed axis of rotation to operate on said blank and the other of which is a free swiveling crank arm journaled on an axis coincident with the fixed axis of the rotary cutting tool and formed with a template engaging guide surface radially offset from said axis and axially aligned at the point of template engagement thereon with the peripheral cutting portion of said rotary cutter at the work engagement place where cutting action occurs.

2. For forming a blank, a template complementary to an existing template which has been fixed to the blank in superposed relation, a rotary cutter for action on the blank, a support mounting the cutter on a fixed axis of rotation, a template engaging guide arm in axially spaced relation to said cutter and means to mount the guide arm swivelly on the axis of cutter rotation with its guide portion in substantially the axial lines of projection of the cutter circumference in all swiveled positions.

3. Mechanism of the character described including a swiveled support, a follower carried by the support with its guide portion eccentrically related to the axis of the support and arranged for freely turning about said axis and a rotary cutter arranged with its axis of rotation coaxial with said swiveled support and axially spaced from said guide portion for cooperation therewith, said rotary cutter having a cutter diameter whose radius corresponds substantially with radius of eccentricity of said guide portion to its swiveled support axis.

4. In combination, a crank arm, a bearing support by which the crank arm is mounted for free swiveling action, a follower guide on the free end of the freely swiveled crank arm, a rotary cutter cooperatively related with the guide and of a cutting diameter whose radius dimension is equal substantially to the distance that the follower guide is offset by the crank arm from its swivel axis and means mounting said cutter for rotation about a fixed axis which is coincident to the swivel axis of the crank arm.

5. For cutting from a blank a template complement in reverse to an existing template while the blank and the existing template are temporarily secured together in overlapping relation and with a spacer therebetween, a rotary cutter arranged to work on the blank on one side of said spacer, a follower guide arranged on the other side of said spacer for engagement with template edge to be reproduced on the existing template and means mounting said follower guide for free swiveling action coaxially of the cutter axis of rotation and in laterally offset relation to the cutter body.

6. For cutting an edge on a workpiece in negative relation to the edge of a template secured to the workpiece, a rotary cutter member, a template guide member, and means mounting said members in laterally offset relation radially of the rotary axis of the cutter, said means including a swiveled arm carrying one of the members for free swinging movement about the other member and in a path such that the active line on template engagement of the guide member is always aligned with the line of cutting action by the cutting member.

7. For negative edge reproduction, a rotary cutter member to act on a workpiece, a guide member for engagement with the edge of a template secured to the workpiece, means to fix the operating position of one of said member and a mounting movably supporting the other member for free travel in a circular path such that the edge portion being cut by the cutter member is aligned axially of the cutter with the edge portion of the template coincidently in engagement with the guide member while the bodies respectively of the template and workpiece beyond said edges are in laterally offset relation.

THEODORE P. KRAUSE.

REFERENCES CITED

The following references are of record in the file of this patent:

UNITED STATES PATENTS

| Number | Name | Date |
|---|---|---|
| 803,137 | Salmon | Oct. 31, 1905 |
| 1,694,022 | Shaw | Dec. 4, 1928 |
| 2,230,292 | Faso | Feb. 4, 1941 |
| 2,317,616 | Jones | Apr. 27, 1943 |

FOREIGN PATENTS

| Number | Country | Date |
|---|---|---|
| 249,814 | Great Britain | Mar. 3, 1927 |

Certificate of Correction

Patent No. 2,507,982                                                   May, 16, 1950

THEODORE P. KRAUSE

It is hereby certified that errors appear in the printed specification of the above numbered patent requiring correction as follows:

Column 2, line 18, for "tranverse" read *transverse*; column 4, line 27, for "engagement" read *engaging*; line 29, after the word "forming" insert *from*; line 48, for "cutter", second occurrence, read *cutting*; column 5, lines 11 and 12, for "cutting" read *cutter*; line 17, for "member" read *members*;

and that the said Letters Patent should be read with these corrections therein that the same may conform to the record of the case in the Patent Office.

Signed and sealed this 29th day of August, A. D. 1950.

[SEAL]

THOMAS F. MURPHY,
*Assistant Commissioner of Patents.*